United States Patent
Gourdet

(10) Patent No.: US 9,543,092 B2
(45) Date of Patent: Jan. 10, 2017

(54) CONTROL DEVICE WITH OPTIMIZED COAXIALITY

(71) Applicants: CONTINENTAL AUTOMOTIVE FRANCE, Toulouse (FR); CONTINENTAL AUTOMOTIVE GMBH, Hannover (DE)

(72) Inventor: Noemie Gourdet, Auneau (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 26 days.

(21) Appl. No.: 14/407,572

(22) PCT Filed: Jun. 28, 2013

(86) PCT No.: PCT/EP2013/001912
§ 371 (c)(1),
(2) Date: Dec. 12, 2014

(87) PCT Pub. No.: WO2014/005688
PCT Pub. Date: Jan. 9, 2014

(65) Prior Publication Data
US 2015/0155118 A1    Jun. 4, 2015

(30) Foreign Application Priority Data

Jul. 3, 2012 (FR) .................................... 12 56350

(51) Int. Cl.
*H01H 3/08* (2006.01)
*H01H 19/00* (2006.01)
(Continued)

(52) U.S. Cl.
CPC .............. *H01H 19/14* (2013.01); *B60K 37/06* (2013.01); *G05G 1/12* (2013.01); *H01H 3/10* (2013.01);
(Continued)

(58) Field of Classification Search
CPC .......... H01H 3/08; H01H 19/00; H01H 19/14; H01H 21/00; H01H 3/00; H01H 3/02; H01H 3/10; H01H 19/001; H01H 19/02; H01H 19/20; H01H 19/24; H01H 19/28; H01H 19/32; H01H 19/54; H01H 19/60; H01H 2009/0088
(Continued)

(56) References Cited

U.S. PATENT DOCUMENTS 3,193,312 A    7/1965 Ehner
3,370,482 A *  2/1968 Manecke ................. H01H 3/10
                                              200/293
(Continued)

FOREIGN PATENT DOCUMENTS

JP    4057111 A    2/1992

OTHER PUBLICATIONS

International Search Report, dated Aug. 13, 2013, from corresponding PCT application.

*Primary Examiner* — Renee S Luebke
*Assistant Examiner* — Anthony R. Jimenez
(74) *Attorney, Agent, or Firm* — Young & Thompson

(57) ABSTRACT

A control device, includes a switch (2) with a rotary control rod (20) having a diametrical slot (21) which extends in a plane of reference (P), a molded plastic knob (3) which includes a housing receiving the control rod, the housing including two flexible fingers (31, 32) which are diametrically opposed and provided so as to be resilient radially inward, and two fixed fingers (33, 34) which are diametri-
(Continued)

cally opposed and are connected together via a connecting wall (35) which extends along the plane (P), the connecting wall (35) being received in the diametric slot without any play in order to immobilize the knob in relation to the control rod in a direction (Y) perpendicular to the plane (P), the two flexible fingers holding the knob along the axis (A) by friction or by mechanical or spring-assisted blocking.

16 Claims, 4 Drawing Sheets

(51) Int. Cl.
*H01H 19/14* (2006.01)
*H01H 21/00* (2006.01)
*B60K 37/06* (2006.01)
*H01H 3/10* (2006.01)
*G05G 1/12* (2006.01)
*H01H 19/04* (2006.01)

(52) U.S. Cl.
CPC ......... *H01H 19/04* (2013.01); *B60K 2350/102* (2013.01); *B60K 2350/941* (2013.01); *H01H 2221/058* (2013.01); *H01H 2221/074* (2013.01)

(58) Field of Classification Search
USPC ................ 200/179, 19.01, 19.07, 19.18, 19.19,200/19.22, 43.11, 43.12, 43.15, 43.19, 293, 327,200/334, 336; 74/548, 553; 403/289
See application file for complete search history.

(56)  References Cited

U.S. PATENT DOCUMENTS

| | | | |
|---|---|---|---|
| 3,965,529 A * | 6/1976 | Hadzimahalis | F16D 1/0858 16/441 |
| 4,196,691 A | 4/1980 | Imazeki | |
| 4,984,931 A | 1/1991 | Struthers et al. | |
| 2005/0210632 A1* | 9/2005 | Forrest | H01H 3/10 16/441 |

* cited by examiner

CONTROL DEVICE WITH OPTIMIZED COAXIALITY

BACKGORUND OF THE INVENTION

Field of the Invention

The present invention relates to control devices with optimized coaxiality, in particular to control devices for controlling the operation of one or several members of a motor vehicle by a user.

It concerns more particularly a control device that includes, on the one hand, a switch having a control rod that extends along an axis A and is rotationally mounted in relation to the body of the switch along the axis A, and, on the other hand, a molded plastic knob that includes a housing that has been adapted to receive said control rod. The knob constitutes the user interface of the control device.

Description of the Related Art

One of the problems encountered with this type of control device is the expertise in the assembly of the knob and the control rod. In particular, a potential alignment fault between the knob and the control rod can lead to a "sail" effect when the knob rotates. In other words, it can seem to the user that the knob does not rotate in the round, a phenomena also designated sometimes by the terms out-of-roundness or wobbling. Said potential problems are all the more probable if the diameter of the knob is large in relation to the height and to the diameter of the control rod.

Furthermore, the mechanical imperative which is to be able to assemble and disassemble the knob in relation to the control rod has to be taken in consideration.

According to the present invention, in order to improve the expertise of guiding and of retaining the knob on the control rod, a control device is proposed including:

- a rotary switch having a body and a control rod which extends along an axis A, said control rod having a general cylindrical form, and being mounted with at least one degree of rotational freedom in relation to the body along the axis, said control rod being provided with at least one diametrical slot which extends in a plane of reference P defined by a first diametrical direction and the axis A, said diametrical slot thus defining the first and second half-parts of the rod,
- a molded plastic knob which includes a housing which is adapted to receive said control rod, said housing including at least two flexible fingers which are diametrically opposed and resiliently provided in order to press the two half-parts of the rod radially inward, and at least two fixed fingers which are diametrically opposed and connected together by means of a connecting wall which extends along the plane of reference P.

BREIF SUMMARY OF THE INVENTION

In an advantageous manner, the connecting wall is received in the diametric slot without any substantial play in order to immobilize the knob in relation to the control rod in a direction Y perpendicular to the plane P, the two flexible fingers holding the knob along the axis A by means of friction or by means of mechanical or spring assisted blocking (also called "clipping" in technical jargon).

Thanks to said provisions, the expertise of the coaxiality of the knob and of the control rod is improved, and the effects of the out-of-roundness mentioned further above are minimized.

In various embodiments of the invention, in addition the one and/or the other of the following provisions may be used.

According to another aspect of the invention, the axial depth of the diametrical slot, defined by the distance between the bottom and the top opening of the diametrical slot, is greater than the diameter of the control rod; which promotes good holding of the connecting wall in the reference plane.

According to another aspect of the invention, the control rod includes on its periphery an interface portion (or engagement portion) and the diameter of the rim of the knob is greater than two times the height of said interface portion, in a preferred manner closer to three times the height of said interface portion; such that the expertise of the coaxiality of the knob and of the control rod can be ensured and the out-of-roundness is avoided even when the dimensions of the knob are large in relation to the height and to the diameter of the control rod.

According to yet another aspect of the invention, the first and second half-parts of the rod include a toothing which cooperates with the flexible fingers; such that the axial hold of the knob is improved, in particular for cantilevered stresses on the rim of the knob.

According to another aspect of the invention, the toothing of the control rod comes to bite and/or interfere in an inside surface of the flexible fingers; which means an assembly with pretension allows possible play linked to manufacturing dispersals to be nullified.

According to another aspect of the invention, the device can further include a spring which is arranged in a circumferential manner around the flexible fingers and the fixed fingers in order to press the fingers radially inward; which means that the radial pressure inward is increased and compensation of play is ensured.

According to another aspect of the invention, the device can further include a set screw which is received in a housing that is tapped in order to wedge the connecting wall against one of the faces of the diametrical slot.

According to another aspect of the invention, the connecting wall has an axial end which projects beyond the axial end of the flexible fingers such that for insertion for assembly, the introduction of the connecting wall into the diametrical slot precedes the positioning of the flexible fingers.

According to another aspect of the invention, the fixed fingers frame the half-parts of the rod without substantial play in order to immobilize the knob in relation to the control rod in the first diametrical direction.

BRIEF DESCRIPTION OF THE DRAWINGS

Other aspects, aims and advantages of the invention will appear on reading the following description of one of its embodiments, given by way of a non-limiting example. The invention will also be better understood by looking at the accompanying drawings, in which.

The same references designate identical or similar elements in the different figures.

DETAILED DESCRIPTION OF THE PREFERRED EMBODIMENTS

Figure 1:
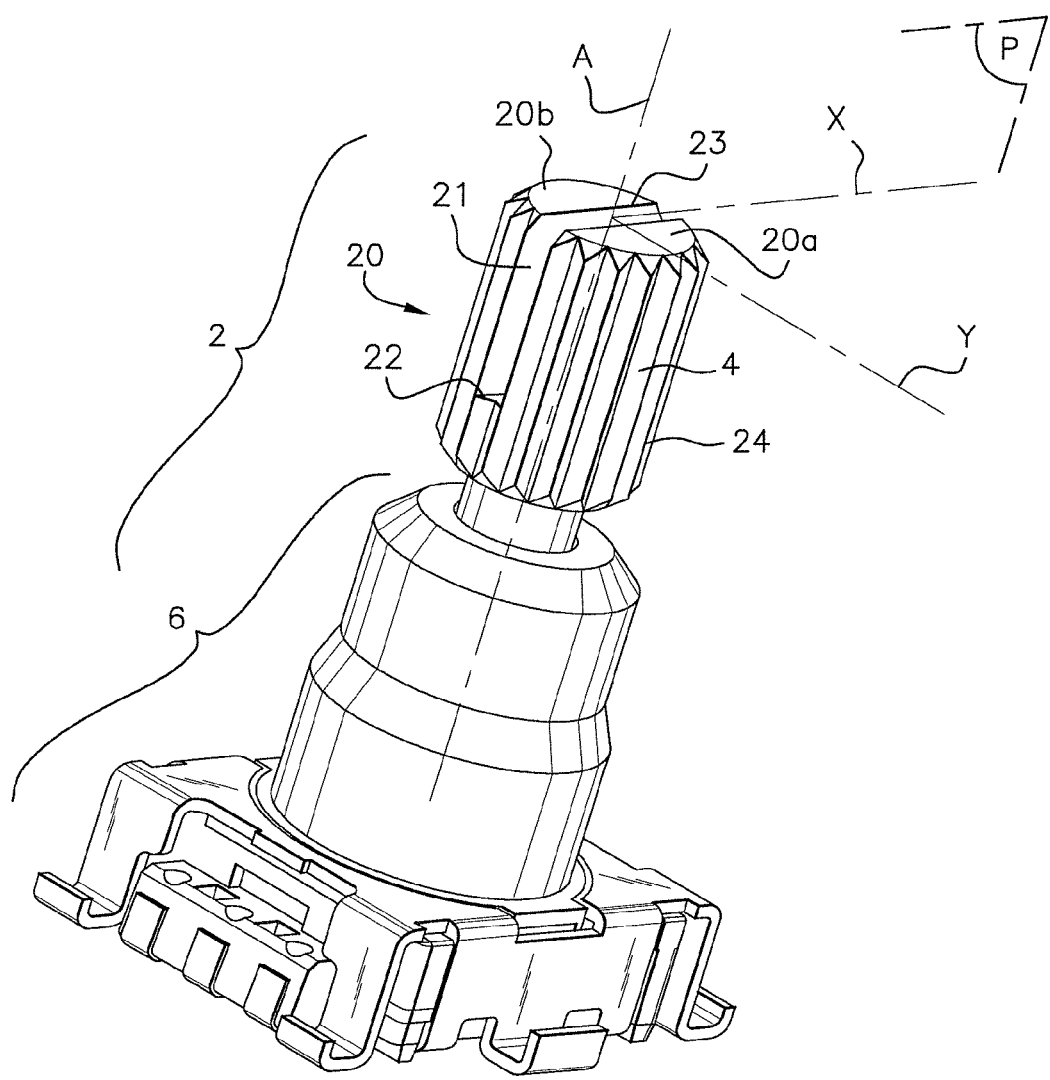
FIG. 1 shows a perspective view of a switch used in a control device according to the invention.
Figure 2:
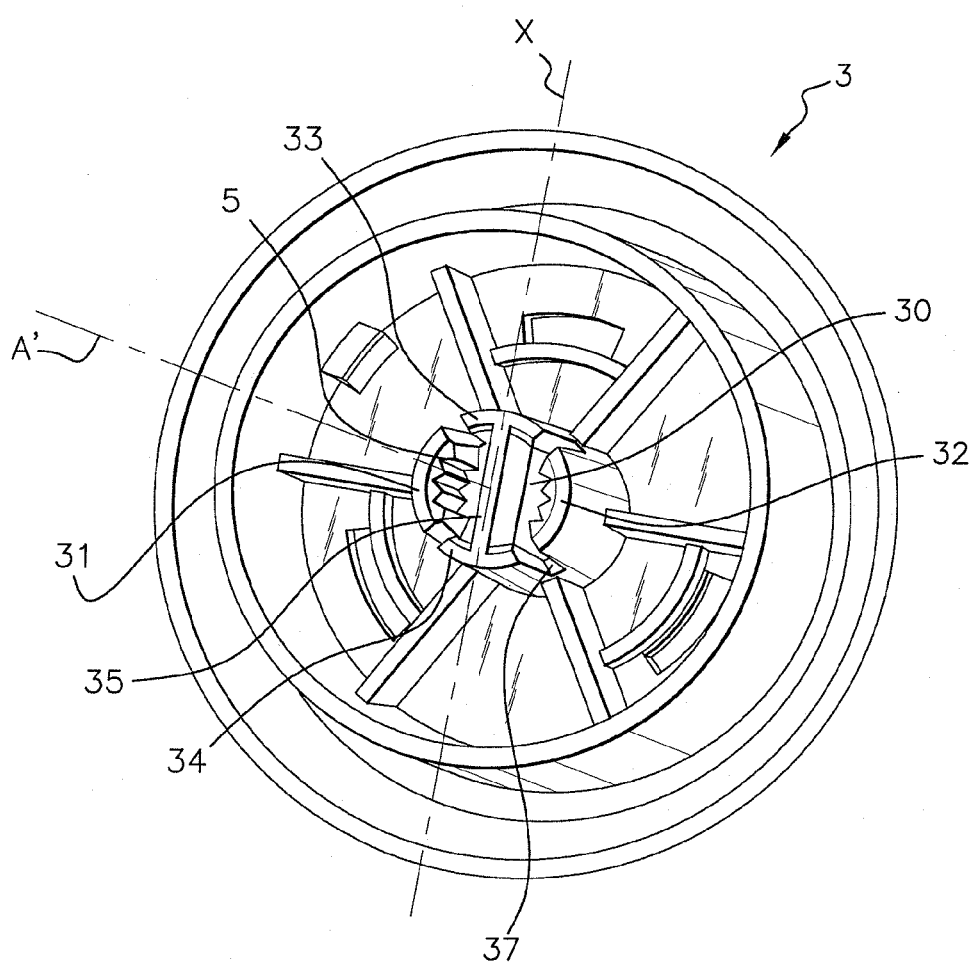
FIG. 2 shows a perspective view of a knob used in the control device in FIG. 1.
Figure 3:
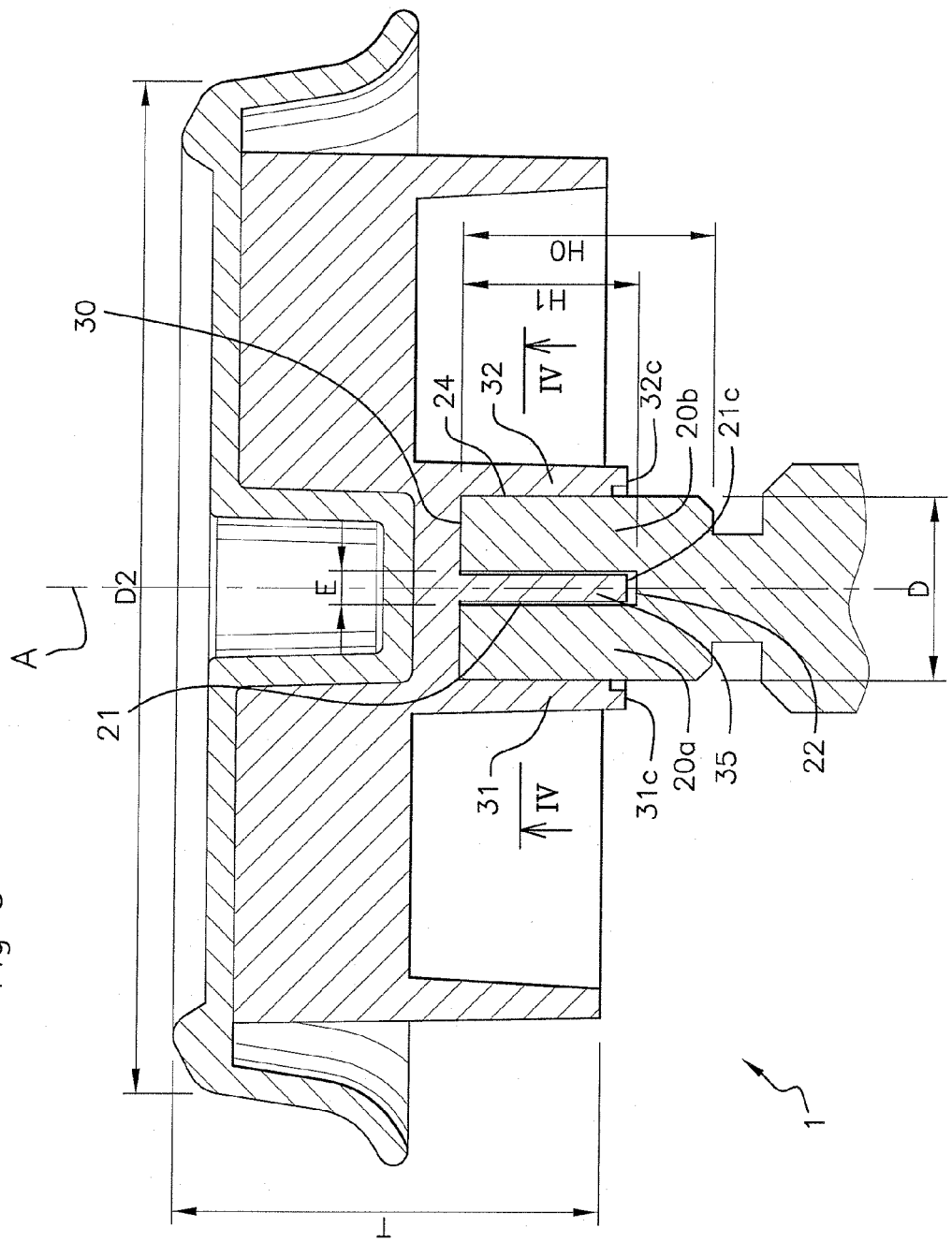
FIG. 3 shows a longitudinal section of the device according to the line III-III in FIG. 4.
Figure 4:
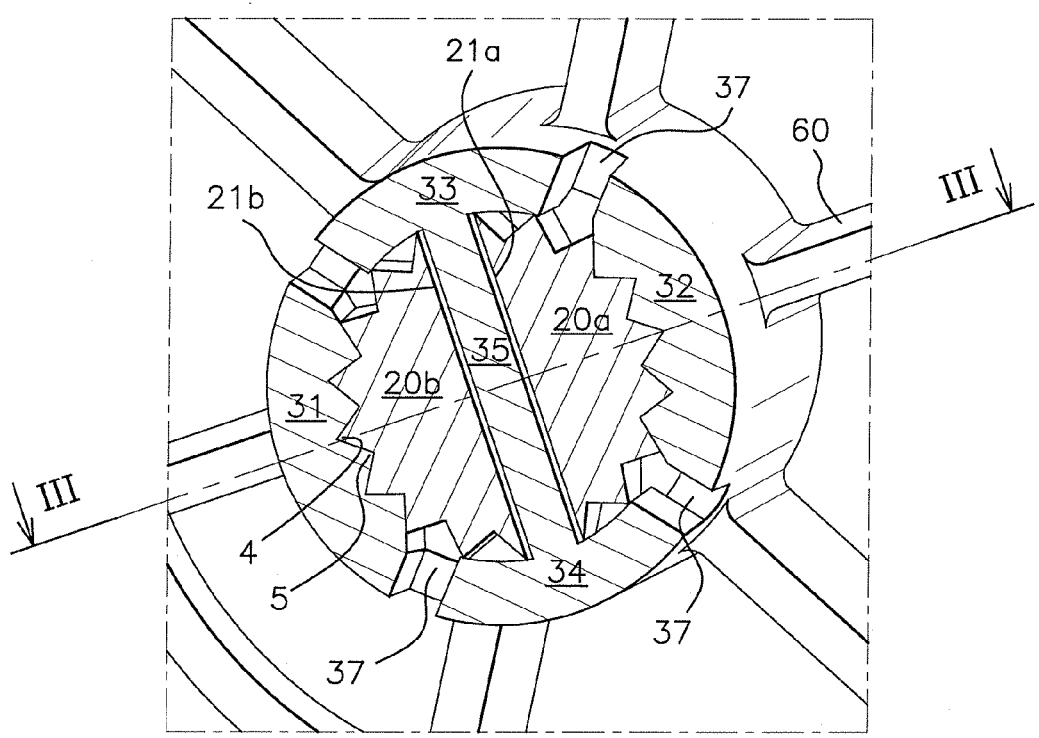
FIG. 4 shows a cross section of the device according to the line IV-IV in FIG. 3.

FIG. 1 shows a switch 2 which is used in a control device 1 according to the invention. The switch 2 includes a body 6 which is mounted on an electronic card or another type of support (not shown). In particular, the switch 2 can be an electric or electronic switch that is configured to control the operation of one or several members of a motor vehicle by a user. However, the invention can be applied to any type of rotary switch.

A control rod 20, which extends along an axis A and is realized in metal or hard plastics material, is mounted on the body 6. In the example shown, the control rod 20 is mounted so as to rotate around the axis A with, in addition, a path in the axial direction (an additional function can be activated or deactivated by pressing down on the control rod 20).

As can be seen in FIGS. 1 to 4, the control rod 20 is shown in the example given as a generally cylindrical rod with a diameter D in which is arranged a diametrical slot 21 which extends in a plane of reference P that is defined by a first diametrical direction X and the axis A.

The diametrical slot 21 has a constant width E and includes a bottom 22 and a top opening 23 which leads to the opposite side of the body 6, which defines an axial depth H1 for said diametrical slot 21. Furthermore, the diametrical slot 21 crosses the control rod 20 from one end to the other between two opposite lateral openings. Said diametrical slot 21 thus defines the first and second half-parts 20a, 20b of the rod which are arranged symmetrically in relation to the plane P.

The outside peripheral zone of each half-part 20a, 20b of the rod includes a toothing 4; in this case there are projections with a triangular section in a cross plane which extend over the entire height of a part of the control rod 20 that is called the interface portion 24. Said interface portion 24 has a noted height H0 and is intended to be received in a housing of a knob which will be described below.

Furthermore, the control device includes a molded plastic knob 3 which constitutes the user interface for the control device. It must be noted that said knob 3 can also be called a dome, cap or something other.

Said knob 3 has a general circular shape around an axis A', normally mistaken for the axis A after assembly of the knob 3 on the control rod 20. The diametrical dimensions of the knob 3 are greater than its axial dimensions; the outside rim 38 of the knob 3, in the example shown, has a diameter D2 which is greater than the axial thickness T of the knob 3.

The knob 3 could be solid and realized integrally in one single part, but, as illustrated, it can be composed of one technical part and one part with a feature with a pictogram (not shown).

The knob 3 includes a housing 30 which is centered on A' and is adapted so as to receive the control rod 20. In addition, said housing 30 includes two flexible fingers 31, 32 which are diametrically opposed and are provided so as to be resilient so as to press the two half-parts 20a, 20b of the rod radially inward.

Each flexible finger 31, 32 includes an outside portion of the cylindrical wall which is centered on A' and extends over an angular sector of between 60 and 120 degrees inclusive.

On the face that is turned inward, each of the flexible fingers 31, 32 can include a complementary toothing 5 of the toothing 4 of the control rod 20 that has already been mentioned further above. As an alternative to this, said face that is turned inward can be devoid of toothing and can be in the form of a simple, smooth cylindrical surface; and in this case interaction is provided between the preferably hard teeth of the toothing 4 of the control rod 20 and the softer cylindrical surface of the flexible finger 31, 32. In other words, the toothing 4 of the control rod 20 comes to bite and/or interfere in an inside surface of the flexible fingers 31, 32. In this way, elimination of possible play and anchoring in order to limit the movements under stress are obtained at the same time.

Moreover, said housing includes two fixed fingers 33, 34 which are diametrically opposed and are connected together by means of a connecting wall 35 which extends along the plane P.

The connecting wall 35 is planar and its thickness is substantially identical to the width E of the diametrical slot 21. The dimension of the connecting wall 35 along the diametrical direction X is equal to or slightly in excess of the diameter D of the control rod 20. The dimension of the connecting wall 35 along the axial direction A is equal to, slightly less than or slightly in excess of the depth H1 of the diametrical slot 21.

In the example shown, the flexible fingers 31, 32 and the fixed fingers 33, 34 are arranged along a cylinder which is centered on A' and forms the housing 30. Notches 37 are arranged between each flexible finger 31, 32 and the contiguous fixed finger 33, 34 such that the flexible fingers 31, 32 are able to be deformed radially without influencing the adjacent fixed fingers 33, 34.

In an advantageous manner according to the invention, the connecting wall 35 is received in the diametrical slot 21 without substantial play in order to immobilize the knob 3 in relation to the control rod 20 in a direction Y that is perpendicular to the plane P.

In the example shown, the fixed fingers 33, 34 frame the half-parts of the rod 20a, 20b without substantial play in order to immobilize the knob 3 in relation to the control rod 20 in the first diametrical direction X.

More precisely, the points of the toothing 4 of the control rod 20 interact with the inside surface of the fixed fingers 33, 34, which provides assembly with pretension.

The device 1 is assembled by inserting the knob 3 onto the control rod 20 by means of axial translation in the direction A, by indexing the knob 3 beforehand in a rotational movement around A so that the connecting wall 35 is opposite the diametrical slot 21. Abutment is obtained when the end of the control rod 20 reaches the bottom of the housing 30.

In the example shown, the two flexible fingers 31, 32 hold the knob 3 in the assembled position along the axis A by means of friction. However, another solution could be used, for example by means of mechanical or spring-assisted blocking.

In this way, the possibility of disassembling the knob 3 can be anticipated if necessary.

Figure 5:
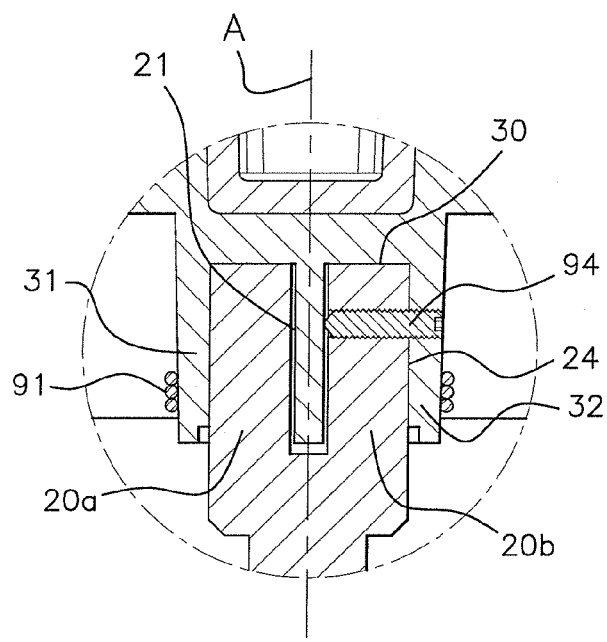
FIG. 5 shows a part view analogous to FIG. 3 which shows optional variants.

According to an optional aspect of the invention that can be seen in FIG. 5, the use of a spring 91 can be provided in addition, for example a coil spring which is arranged in a circumferential manner around the flexible fingers 31, 32 and the fixed fingers 33, 34 so as to press the fingers radially inward.

According to another optional aspect of the invention, as an alternative to the preceding one, which can also be seen in FIG. 5, it is possible to utilize a set screw 94 of the threaded pin type that is received in a housing that is tapped so as to wedge the connecting wall 35 against one of the faces 21a, 21b of the diametrical slot 21.

With regard to the ease of assembly and the angular position coding, in an advantageous manner it can be provided that the axial end 21c of the connecting wall 35 projects beyond the axial end 31c, 32c of the flexible fingers 31, 32 such that for assembly insertion, the introduction of the connecting wall 35 into the diametrical slot 21 precedes the positioning of the flexible fingers 31, 32.

It must be noted that, without departing from the framework of the present invention, it could be possible for the control rod 20 to have a second diametrical slot which is orthogonal to the first one, and, in a complementary manner, another connecting wall in the knob 3 which is orthogonal to the first one.

The second slot could be shorter than the first one and could not lead to the sides of the control rod 20. Furthermore, the second slot could be less deep than the first one. Said second slot improves the retaining of the coaxiality in the plane of reference P.

It must be noted that it could be possible to have more than two flexible fingers 31, 32 and also more than two fixed fingers 33, 34.

In order to limit the effect of out-of-roundness even further, a series of ribs 60 allow the rim 38 of the knob 3 to be held without flexion in relation to the hub that is formed by the housing 30.

It must be noted that the forms of the connecting wall 35 and of the diametrical slot 21 could be different to those provided in the drawings, in particular non planar forms could be used. Any forms whatsoever could be chosen as long as the connecting wall 35 is received and immobilized in the diametrical slot 21 with the complementary shape, always allowing for a degree of freedom along the axis A for insertion and withdrawal.

The invention claimed is:

1. A control device (1), including:
   a rotary switch (2) having a body (6) and a control rod (20) which extends along an axis (A), said control rod (20) having a general cylindrical form, and being mounted with at least one degree of rotational freedom in relation to the body (6) along the axis (A), said control rod (20) being provided with at least one diametrical slot (21) which extends in a plane of reference (P) defined by a first diametrical direction (X) and the axis (A), said diametrical slot (21) thus defining the first and second half-parts (20a, 20b) of the rod,
   a molded plastic knob (3) which includes a housing which is adapted to receive said control rod (20), said housing including at least two flexible fingers (31, 32) which are diametrically opposed and resiliently provided in order to press the two half-parts (20a, 20b) of the rod radially inward, and at least two fixed fingers (33, 34) which are diametrically opposed and connected together by means of a connecting wall (35) which extends along the plane (P), the connecting wall (35) being received in the diametrical slot (21) without any substantial play in order to immobilize the knob (3) in relation to the control rod (20) in a direction (Y) perpendicular to the plane of reference (P), the two flexible fingers (31, 32) holding the knob (3) along the axis (A) by means of friction or by means of mechanical or spring-assisted blocking.

2. The control device as claimed in claim 1, further including a spring (91) which is arranged in a circumferential manner around the flexible fingers (31, 32) and the fixed fingers (33, 34) in order to press the fingers radially inward.

3. The control device as claimed in claim 1, further including a set screw (94) which is received in a housing that is tapped in order to wedge the connecting wall (35) against one of the faces (21a, 21b) of the diametrical slot (21).

4. The control device as claimed in claim 1, wherein the fixed fingers (33, 34) frame the half-parts (20a, 20b) of the rod without substantial play in order to immobilize the knob (3) in relation to the control rod (20) in the first diametrical direction (X).

5. The control device as claimed in claim 1, wherein the rotary switch (2) is an electric or electronic switch which is configured for controlling the operation of one or several members of a motor vehicle by a user.

6. The control device (1) of claim 1, wherein,
   a first end of a first of the fixed fingers is located adjacent and spaced apart from a first end of a first of the flexible fingers,
   a second end of the first of the fixed fingers is located adjacent and spaced apart from a first end of a second of the flexible fingers,
   a first end of a second of the fixed fingers is located adjacent and spaced apart from a second end of the first of the flexible fingers, and
   a second end of the second of the fixed fingers is located adjacent and spaced apart from a second end of the second of the flexible fingers.

7. The control device as claimed in claim 1, wherein the axial depth (H1) of the diametrical slot (21), defined by the distance between the bottom (22) and the top opening (23) of the diametrical slot (21), is greater than the diameter (D) of the control rod (20).

8. The control device as claimed in claim 7, wherein the control rod (20) includes an engagement portion (24) and the diameter (D2) of the rim of the knob (3) is greater than two times the height (H0) of said engagement portion (24).

9. The control device as claimed in claim 7, wherein the first and second half-parts (20a, 20b) of the rod include a toothing (4) which cooperates with the flexible fingers (31, 32).

10. The control device as claimed in claim 1, wherein the control rod (20) includes an engagement portion (24) and the diameter (D2) of the rim of the knob (3) is greater than two times the height (H0) of said engagement portion (24).

11. The control device as claimed in claim 10, wherein the first and second half-parts (20a, 20b) of the rod include a toothing (4) which cooperates with the flexible fingers (31, 32).

12. The control device as claimed in claim 1, wherein the first and second half-parts (20a, 20b) of the rod include a toothing (4) which cooperates with the flexible fingers (31, 32).

13. The control device as claimed in claim 12, wherein the toothing (4) of the control rod (20) comes to bite and/or interfere on an inside surface of the flexible fingers (31, 32).

14. A control device (1), including:
   a rotary switch (2) having a body (6) and a control rod (20) which extends along an axis (A), said control rod (20) having a general cylindrical form, and being mounted with at least one degree of rotational freedom in relation to the body (6) along the axis (A), said control rod (20) being provided with at least one diametrical slot (21) which extends in a plane of reference (P) defined by a first diametrical direction (X) and the axis (A), said diametrical slot (21) thus defining the first and second half-parts (20a, 20b) of the rod,
   a molded plastic knob (3) which includes a housing which is adapted to receive said control rod (20), said housing including at least two flexible fingers (31, 32) which are diametrically opposed and resiliently provided in order to press the two half-parts (20a, 20b) of the rod radially inward, and at least two fixed fingers (33, 34) which are diametrically opposed and connected together by means of a connecting wall (35) which extends along the plane (P), the connecting wall (35) being received in the diametrical slot (21) without any substantial play in order to immobilize the knob (3) in relation to the control rod (20) in a direction (Y) perpendicular to the plane of reference (P), the two flexible fingers (31, 32) holding the knob (3) along the axis (A) by means of friction or by means of mechanical or spring-assisted blocking, wherein the connecting wall (35) has an axial end (21c) which projects beyond the axial end (31c, 32c) of the flexible fingers (31, 32) such that for insertion for assembly, the introduction of the connecting wall (35) into the diametrical slot (21) precedes the positioning of the flexible fingers (31, 32).

15. A control device (1), comprising:

a rotary switch (2) having a body (6) and a control rod (20) which extends along an axis (A), said control rod (20) being mounted with at least one degree of rotational freedom in relation to the body (6) along the axis (A), said control rod (20) being provided with a diametrical slot (21) which extends in a plane of reference (P) defined by a first diametrical direction (X) and the axis (A), said diametrical slot (21) defining the first and second half-parts (20a, 20b) of the rod; and a molded plastic knob (3) which includes a housing, said control rod (20) being received in the housing, said housing including i) two flexible fingers (31, 32) which are diametrically opposed and resilient, inner surfaces of each of the flexible fingers (31, 32) bearing on diametrically opposite outer surfaces of the control rod (20) in order to press the two half-parts (20a, 20b) of the rod radially inward, ii) two fixed fingers (33, 34) which are diametrically opposed, inner surfaces of each of the fixed fingers (33, 34) being arranged along diametrically opposite outer surfaces of the control rod (20), and iii) a connecting wall (35) that extends along the plane (P) and connects the two fixed fingers (33, 34), wherein the connecting wall (35) is received in the diametrical slot (21) without any substantial play in order to immobilize the knob (3) in relation to the control rod (20) in a direction (Y) perpendicular to the plane of reference (P), the two flexible fingers (31, 32) holding the knob (3) along the axis (A).

16. The control device (1) of claim 15, wherein, a first end of a first of the fixed fingers is located adjacent and spaced apart from a first end of a first of the flexible fingers, a second end of the first of the fixed fingers is located adjacent and spaced apart from a first end of a second of the flexible fingers, a first end of a second of the fixed fingers is located adjacent and spaced apart from a second end of the first of the flexible fingers, and a second end of the second of the fixed fingers is located adjacent and spaced apart from a second end of the second of the flexible fingers.

* * * * *